US005487102A

United States Patent [19]
Rothschild et al.

[11] Patent Number: 5,487,102
[45] Date of Patent: Jan. 23, 1996

[54] VOICE INTERFACE BOARD FOR USE IN AN OPERATOR SYSTEM

[75] Inventors: Ralph F. Rothschild, Monsey, N.Y.; George D. Kontopidis, Dedham; Charles C. Linton, Southboro, both of Mass.

[73] Assignee: Volt Information Sciences, Inc., New York, N.Y.

[21] Appl. No.: 988,554

[22] Filed: Dec. 10, 1992

[51] Int. Cl.⁶ .......................... H04M 1/00; H04M 3/00; H03G 3/00

[52] U.S. Cl. ................ 379/67; 37/223; 37/395; 381/104

[58] Field of Search .................. 379/67, 223, 89, 379/395; 381/104, 109, 68.4

[56] References Cited

U.S. PATENT DOCUMENTS

| | | | |
|---|---|---|---|
| 4,317,007 | 2/1982 | Harrison | 179/18 BC |
| 4,445,002 | 4/1984 | Terry | 179/81 |
| 4,484,322 | 11/1984 | Fossat et al. | 370/23 |
| 4,602,133 | 7/1986 | O'Neill | 179/170 |
| 4,620,066 | 10/1986 | Bushnell | 379/223 |
| 4,623,761 | 11/1986 | Winter et al. | 379/84 |
| 4,677,609 | 6/1987 | Piereth et al. | 370/60 |
| 4,697,282 | 9/1987 | Winter et al. | 379/67 |
| 4,734,930 | 3/1988 | Quiros et al. | 379/88 |
| 4,825,459 | 4/1989 | Farrow et al. | 379/3 |
| 4,879,738 | 11/1989 | Petro | 379/3 |
| 4,918,322 | 4/1990 | Winter et al. | 379/88 |
| 5,014,303 | 5/1991 | Velius | 379/265 |
| 5,157,718 | 10/1992 | Kaplan | 379/223 |
| 5,193,110 | 3/1993 | Jones | 379/233 |
| 5,210,789 | 5/1993 | Jeffus | 379/267 |
| 5,222,120 | 6/1993 | McLeod | 379/196 |
| 5,313,523 | 8/1994 | Kawanchi | 379/395 |

OTHER PUBLICATIONS

Natural MicroSystems, Product Bulletin: VBX 100 Single-Port Voice Board, undated.

*Primary Examiner*—Jeffery A. Hofsass
*Assistant Examiner*—Daniel S. Hunter
*Attorney, Agent, or Firm*—Kenyon & Kenyon

[57] ABSTRACT

In an operator system for providing services to subscribers in a public telephone network, a circuit board for controlling audio characteristics of audio signals in the public telephone network. The circuit board comprises an interface for receiving the audio signal from the public telephone network, an audio characteristics control circuit coupled to the interface for receiving the audio signal, adjusting the audio characteristics of the audio signal and for recording and generating voice messages to be transmitted to the public telephone network via the interface and a headset interface coupled to the audio characteristics control circuit for receiving the adjusted audio signal and providing an interface to at least two headsets.

25 Claims, 4 Drawing Sheets

VOICE INTERFACE BOARD FOR USE IN AN OPERATOR SYSTEM

FIELD OF THE INVENTION

The present invention relates to an operator workstation in an operator service center and, more particularly, to an operator workstation having a voice interface board that provides an operator with an interface to a public telephone network that controls audio characteristics of audio signals received from and transmitted to the public telephone network from the operator workstation.

BACKGROUND OF THE INVENTION

An operator service center provides operator services to callers or subscribers. An operator workstation is used by an operator in an operator service center for assisting subscribers connected to a public telephone network to make a call or to answer their questions.

An operator workstation must meet several criteria which are standard in the industry (as specified in Bellcore's OSSGR Sections 7 and 21 Performance Requirements, Issue 1, February 1991) pertaining to transmit and receive signals to protect the operator who uses the operator position all day. These criteria specify sidetone level, volume level, limiting and echo control.

Sidetone is a portion of operator speech which is fed back to the receive path to permit the operator to hear his or her own voice. The feedback operator speech is attenuated to prevent the operator from lowering his or her own voice and preventing insufficient signal levels from being transmitted. Echo from an operator's voice signal in a telephone system can occur at the junction of a four-wire to a two-wire interface. Echo control involves calculating the maximum allowable level of echo from the level of the operator's transmit speech and inserting loss in the receive path at the estimated time of arrival of the echo. Limiting looks for high tones in the receive path and inserts loss to attenuate the high tones to protect the operator's hearing. Volume control allows for lowering or increasing the volume level of incoming voice signals.

The audio signals from the public telephone network must be routed to the operator workstations to control these specific characteristics. This would allow the operator to control the audio signal that he or she hears through a headset coupled to the workstation.

Prior approaches have implemented these various controls utilizing analog circuits which are relatively harder and more expensive to manufacture and more prone to errors. Analog circuits also require adjustment of all parameters during manufacture. Thus, the quality of delivered devices might suffer, resulting in some loss in customer goodwill.

Other prior approaches implemented these controls utilizing digital circuits to process speech digitally to provide the operator using the operator position with complete control over echo control, acoustic limiting, sidetone control and volume control. While this approach may be more reliable than the analog approach described above, it cannot guarantee that the operator adjustments of the audio criteria will meet or exceed the Bellcore OSSGR requirements for an operator position.

In addition to providing an operator with the ability to control the audio characteristics of audio signals, it is also desirable for an operator workstation to provide the operator with some automated mechanism to generate voice messages that can be played back to the subscribers. This is desirable because more and more operator service centers are relying on automated voice processing to generate greeting and response messages to service caller inquiries. The automated voice feature alleviates the need for an operator to vocalize greetings and responses to subscribers.

It is also desirable to provide both an operator and an operator supervisor with access to incoming calls so communications with subscribers can be monitored. This allows a supervisor to roam the operator service center with a headset on and simply plug into an operator workstation to monitor the servicing of a subscribers call. Prior operator workstations that have provided this functionality have been unable to prevent a signal loss from occurring on the connection between the operator and subscriber when the supervisor connects to the workstation. This signal loss can result in the operator or subscriber having to repeat themselves which thereby reduces the efficiency of the service.

Prior art approaches have not presented a solution to the above problems in a single board that could be added to operator workstations. Since the platform for most operator workstations are personal computers, the amount of space available in the personal computer to provide additional functionality becomes critical.

SUMMARY OF THE INVENTION

The present invention provides a voice interface board for use in an operator workstation that provides the operator with an interface to the public telephone network that provides software settable control of audio characteristics while guaranteeing compliance with the Bellcore OSSGR requirements. The voice interface board of the present invention also provides voice recording and play back capabilities and an interface that allows an operator supervisor to freely monitor operator activities by plugging into an operator workstation and not causing any resulting signal loss on the connection between the operator and subscriber.

The voice interface circuit board of the present invention is a device for controlling audio characteristics of audio signals in a telecommunications network. The board comprises an interface for receiving the audio signals from the telecommunications network, an audio characteristics control circuit coupled to the interface and the processor for receiving the audio signals, adjusting the audio characteristics of the audio signals and for generating voice messages to be transmitted to the telecommunications network, and a headset interface coupled to the audio characteristics control circuit for receiving the adjusted audio signals and providing an interface to at least two operator headsets.

The audio characteristics control circuit comprises separate digital-to-analog converters, e.g., multiplying digital-to-analog convertors, that are positioned in the path of the received audio signals to control specific audio characteristics. Each digital-to-analog converter controls different audio characteristics. For example, one is used to control the volume level of the received audio signals, another is used to control the volume level of the audio signals transmitted from the operator to the public telephone network.

The headset interface of the voice interface board is arranged so that an operator headset and a supervisor headset are independent of each other so that signals received from one headset are not altered by inserting or removing the other headset. This is achieved by providing separate transmission and receive paths for the operator and supervisor headsets.

The present invention also allows the operator to control the volume level of the audio signal received and transmitted by the operator and also to direct the processor to play back voice response messages. The receive volume level is automatically reset to a default value at the end of each call or at the beginning of each new call.

DETAILED DESCRIPTION

Figure 1:
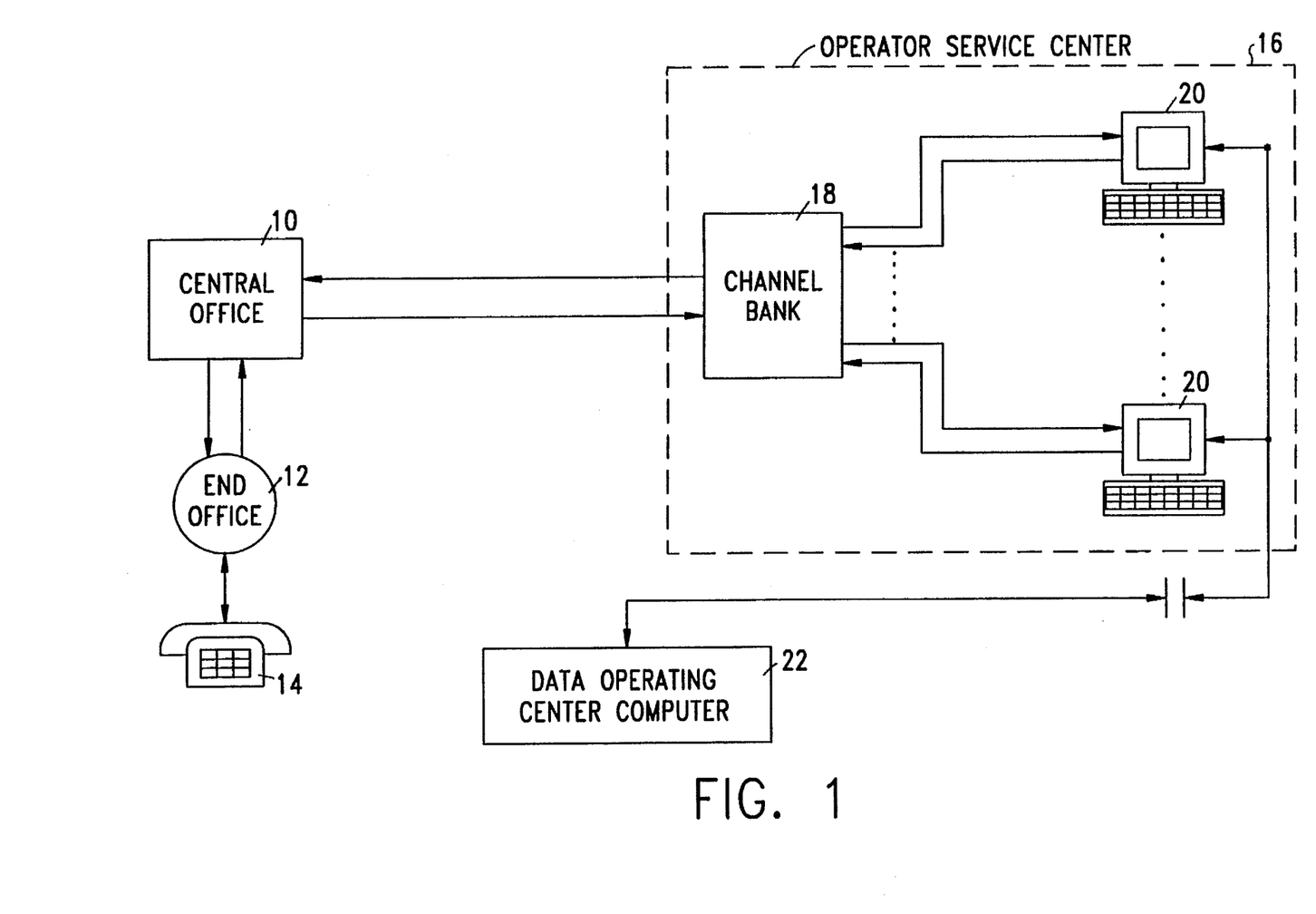
FIG. 1 is a block diagram of an operator system for interconnecting an operator workstation in an operator service center with a subscriber station.

Referring now to the drawings and initially to FIG. 1, there is illustrated a block diagram of an operator system to illustrate how an operator in an operator service center is interconnected through a public telephone network to a subscriber station. As shown, a subscriber station 14 is coupled to an end office 12 which, in turn, is coupled to a central office 10. The central office 10 is coupled to an operator service center 16 via a T1 carrier link. It is known that a T1 carrier is capable of carrying 24 different multiplexed digital signals on a dual, two wire pair, one pair for transmit, the other for receive.

The operator service center 16 comprises a channel bank 18 coupled to a plurality of operator workstations 20. The channel bank 18 receives multiplexed digital signals, demultiplexes the received signals into 24 separate digital signals and then converts them to analog audio signals which are coupled to the operator workstations 20. The channel bank 18 also converts analog audio signals received from the plurality of operator workstations 20, multiplexes them into a T1 carrier signal and then transmits the signal to the central office 10.

Each one of the plurality of operator workstations 20 are intercoupled by a local area network, e.g., Ethernet, which is then coupled through a network gateway (not shown) to an offsite computer 22 which serves as a data operating center ("DOC") for the operator service center 16. The DOC computer 22 has associated memory where information such as telephone directory listings and information to control the plurality of operator workstations 20 are stored.

Figure 2:
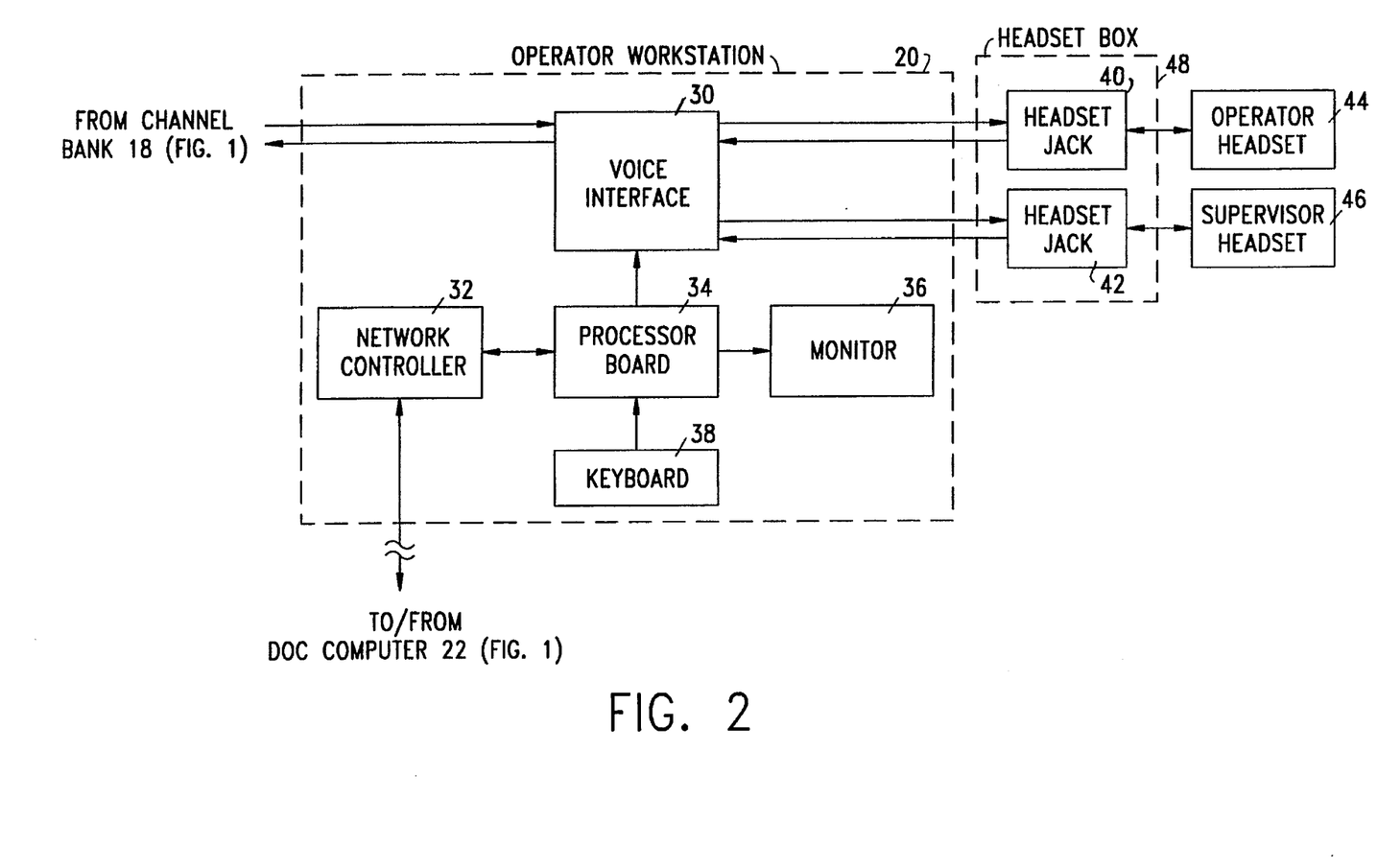
FIG. 2 is a block diagram of the operator workstation illustrated in FIG. 1.

A functional block diagram of an operator workstation 20 is illustrated in FIG. 2. The operator workstation 20 comprises a voice interface board 30, a network controller 32, a processor board 34, a monitor 36 and a keyboard 38. Headset jacks 40 and 42 in headset box 48, which are not part of the operator workstation 20, are also shown to illustrate the interface where an operator or supervisor plugs into the workstation 20 in the exemplary embodiment. The monitor 36 and keyboard 38 provide the operator with an input/output interface to the operator workstation 20. The processor board 34, coupled to the monitor 36, keyboard 38, network controller 32 and voice interface board 30, sends and receives information from the operator interface (monitor 36 and keyboard 38) and the DOG computer 22 (FIG. 1) through the network controller 32. The processor board 34 generates signals in response to signals received from the operator interface (monitor 36 and keyboard 38) and the DOG computer 22 (FIG. 1) to control the operation of the voice interface board 30.

The voice interface board 30 intercouples audio signals from the channel bank 18 (FIG. 1) to an operator headset 44, and, if appropriate, a supervisor headset 46. The voice interface board 30 conditions and controls the audio characteristics of the audio signals transmitted between the channel bank 18 and the operator headset 44 and supervisor headset 46.

Figure 3:
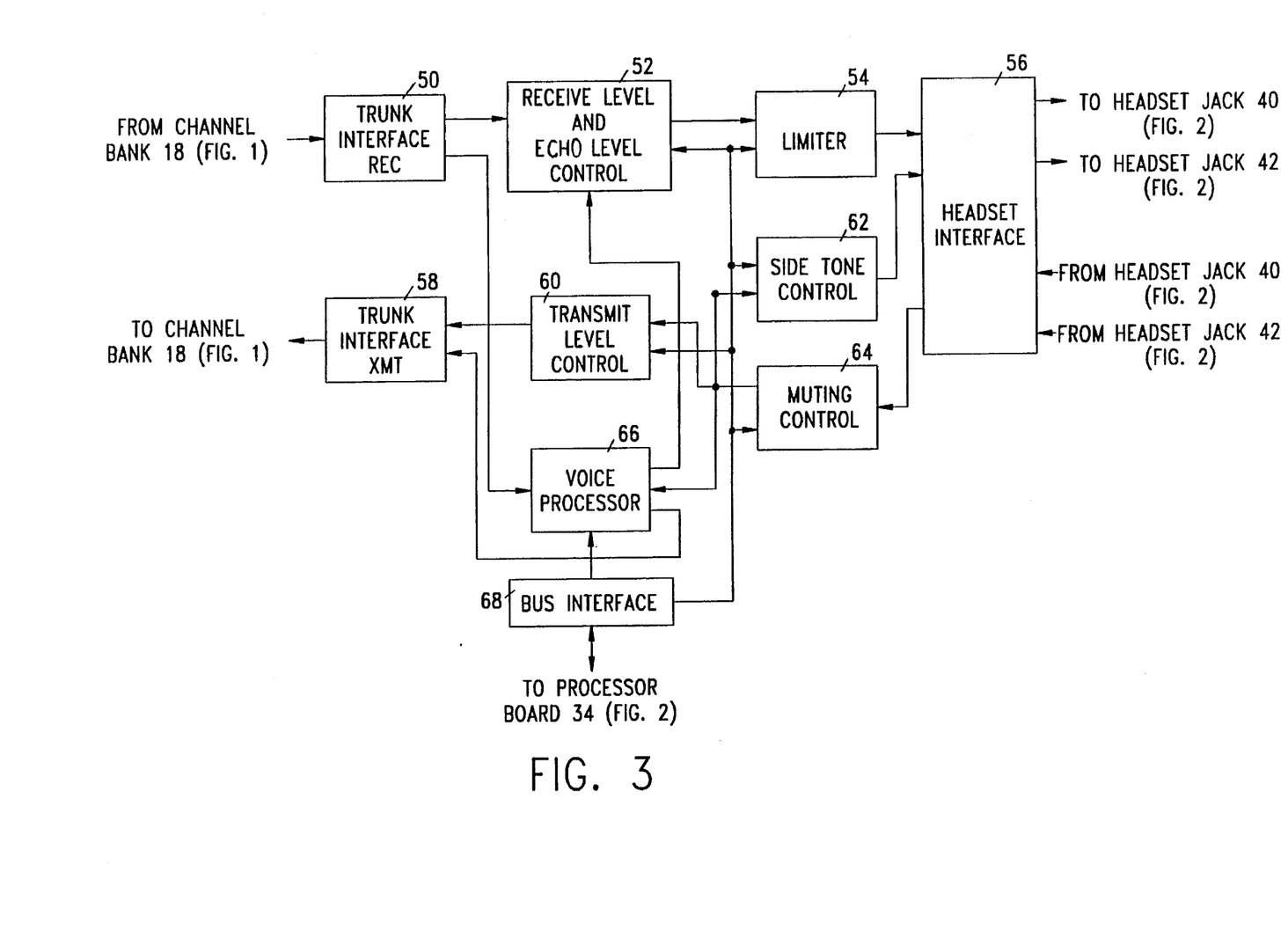
FIG. 3 is a block diagram of the voice interface board illustrated in FIG. 2.

FIG. 3 is a functional block diagram of the voice interface board 30 illustrated in FIG. 2. In an exemplary embodiment, the voice interface board 30 comprises a VBX-100 Single Port Voice Processing Card manufactured and sold by Natural Microsystems, Inc. of Natick, Mass. The VBX-100 provides the voice processing capabilities for the voice interface board 30.

The voice interface board 30 comprises a trunk interface REC 50, receive level and echo level control 52, a limiter 54, a headset interface 56, a trunk interface XMT 58, transmit level control 60, sidetone control 62, muting control 64, a voice processor 66 and a bus interface 68. As explained above, the voice processor 66 comprises the circuitry of the publicly available VBX-100 board.

The voice interface board 30 can be divided into a receive path and a transmit path. The receive path includes the trunk interface REC 50, the receive level and echo level control 52, the limiter 54, and the headset interface 56. In operation, the trunk interface REC 50 receives an audio signal from the channel bank 18 (FIG. 1) and passes the signal to the receive level and echo level control 52, which then passes the signal to the limiter 54, and then to the headset interface 56. The trunk interface REC 50 also passes the audio signal to the voice processor 66. The transmit path includes the headset interface 56, the trunk interface XMT 58, the transmit level control 60, the sidetone control 62 and the muting control 64. The headset interface 56 receives an audio signal from one of the headset jacks 40 or 42 and passes the signal to the muting control 64 which then passes the signal to the sidetone control 62, the transmit level control 60 and the voice processor 66. The signal is then passed by the transmit level control 60 to the trunk interface XMT 58.

The voice processor 66 is controlled by the processor board 34 (FIG. 2) via the bus interface 68. Based on signals received from the processor board 34, the voice processor 66 controls the receive level and echo level control 52 to accomplish the echo control function. The processor board 34, through the bus interface 68, also controls the receive level and echo level control 52 in addition to the remaining control circuitry blocks of the voice interface board 30 to alter a specific audio characteristic of the signal. The voice processor 66 is also capable of recording a voice and presenting that voice to the subscriber station 14 (FIG. 1) via the channel bank 18 and to the participating operator via the headset interface 56.

The bus interface 68 in the exemplary embodiment is a standard 16-bit AT compatible bus interface. It could also be, for example, a standard bus interface to the IBM PS/2 Microchannel or to the Sun Microsystems Sbus. The processor board 34 and the voice processor 66 communicate via registers (not shown) in the bus interface 68.

The muting control 64 is capable of disabling input of the audio signal into the voice processor 66.

The trunk interface REC 50 provides a four wire E & M telephone trunk circuit which interfaces to the channel bank 18 to receive audio signals. It essentially matches the impedance of the channel bank 18 with that of the voice interface board 30 and electrically isolates the telephone trunk circuit from the rest of the voice interface board 30.

The receive level and echo level control 52 conditions the received audio signal to adjust the voltage level of the signal which in turn, controls signal volume and echo effects in the signal. The voice processor 66 may control the operation of echo control and the volume level of the receive signal of the receive level and echo level control 52 while the processor board 34 may also control the volume level of the receive signal. The echo level control feature can be enabled or disabled by either the processor board 34 or the voice processor 66.

The limiter 54 further conditions the received audio signal by providing a volume limit on the received audio signal. The limiter 54 is enabled or disabled by the processor board 34.

The headset interface 56 matches the impedance of the voice interface board 30 to the operator headset 44 and the supervisor headset 46 microphone and earpiece. The headset interface 56 takes the signal from the limiter 54, adds in a portion of the microphone signal under programmable gain control for sidetone, and drives the resulting signal out to both the operator headset 44 and supervisor headset 46. The headset interface 56 effectively isolates the signals transmitted to the operator headset 44 and the supervisor headset 46 so that the connection or disconnection of one of the headsets 44 or 46 will not affect the audio signal being transmitted to the other headset (44 or 46) or to the subscriber station 14 (FIG. 1). This is accomplished by separately driving each headset connection so that a signal received or sent from, e.g., the headset 44 will not be altered by inserting or removing the headset 46.

Figure 4:
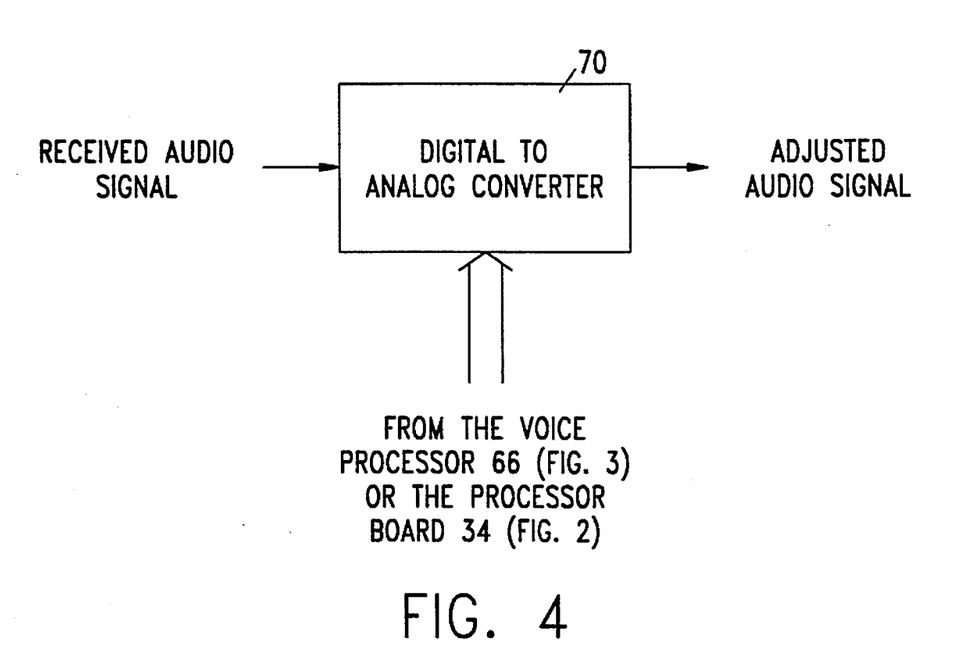
FIG. 4 is an exemplary circuit diagram of the control circuitry illustrated in FIG. 3.

Reference is now made to FIG. 4 to explain how the control circuitry in the voice interface board 30 operates under the control of the processor board 34 and the voice processor 66. Each of the receive level and echo level control 52, the transmit level control 60, the sidetone control 62 and the muting control 64 comprise a multiplying digital-to-analog converter ("DAC") 70. An example of a commercially available multiplying DAC used in the exemplary embodiment is a DAC8229 manufactured and sold by Analog Devices. The DAC 70 receives an eight or twelve bit reference signal from the processor board 34 or the voice processor 66 as one input. The other input is the received audio signal. The DAC 70 utilizes the reference signal to generate an analog output signal (the adjusted audio signal) which is proportional to the product of the received audio signal and the fractional equivalent of the reference signal. By controlling the value of the reference signal, the processor board 34 or the voice processor 66 is able to control a specific audio characteristic of the audio signal.

In operation, an operator using an operator workstation 20 logs on to the DOC computer 22. Stored on the DOC computer 22 is an operator profile for each operator working in the operator service center 16. The operator profile contains parameters which are downloaded through the network to the operator workstation 20 to control the audio characteristics of audio signals received by and transmitted from the operator workstation 20. This allows for the customization of each operator workstation 20 for the current operator who is working on one of the operator workstations 20.

The parameters stored on the DOC computer 22 are used to control (1) the volume level of the audio signal received by the operator, (2) the volume level of the audio signal transmitted by the operator to the subscriber station 14, (3) sidetone, (4) echo control including a threshold echo level, maximum gain for echo and echo step size (5) operator microphone mute, (6) supervisor microphone mute, (7) receive level limiter enable/disable and (8) echo control enable/disable. These parameters are downloaded to the operator workstation 20 from the DOC computer 22 through the gateway (not shown). Initially, default parameters are used based on system requirements. For example, a customer can specify the value of the default parameters by requesting that the parameters be set to satisfy Bellcore's OSSGR requirements for an operator workstation. However, as explained below, the operator can control the receive volume level on a per call basis.

The parameters downloaded from the DOC computer 22 are received by the processor board 34. The parameters are then passed by the processor board 34 through the bus interface 68 to either the voice processor 66 or directly to the control circuitry blocks. These signals are routed to the DAC 70 in each of the receive level and echo level control 52, the transmit level control 60, the sidetone control 62 and the muting control 64. As discussed above, the DAC 70 utilizes the control signals to regulate a specific audio characteristic.

The audio characteristics parameters stored in the DOC computer 22 are controlled by a system administrator through a workstation (not shown) coupled to the DOC computer 22. The administrator can provide the same profile for all operators or individual profiles can be developed to meet the individual needs of each operator. This provides greater flexibility for the operator workstation 20.

The audio characteristics that can be controlled by the operator are the receive and transmit volume level. In the exemplary embodiment, the operator controls the receive or transmit level by depressing one of two dedicated keys (volume up key and volume down key) on the keyboard 38 (FIG. 2) to indicate that the level should be increased or decreased. By depressing the keys, the operator causes the keyboard to generate a signal which is sent to the processor board 34. Upon determining what the operator desires to do, the processor board 34 either generates control signals which are sent to the DAC 70 in the receive level and echo level control 52 to adjust the volume of the received audio signal or the transmit level control 60 to adjust the volume of the transmitted audio signal or communicates with the voice processor 66 so that it may generate the control signals to adjust the volume of the received audio signal.

It should be noted that the present invention provides that the operator may adjust the volume for each call. After a call is completed, the processor board 34 or the voice processor 66 can reconfigure the receive level and echo level control 52 to a default receive volume level. This is because each call is from a different person calling from a different location resulting in different characteristics for the audio signals. Note that if the received audio signal is too loud, the limiter 54, if it is enabled by the processor board 34, automatically reduces the volume to a predetermined level.

Although the invention has been shown and described with respect to an exemplary embodiment thereof, it should be understood by those skilled in the art that various other changes, omissions, and additions may be made therein without departing from the spirit and scope of the invention.

What is claimed is:

1. An operator system for providing services to subscribers in a public telephone network, the operator system comprising:

an operator service center for receiving and servicing calls from subscribers, the operator service center comprising:

a channel bank for receiving receive digital audio signals from the public telephone network, converting the receive digital audio signals to receive analog audio signals, converting transmit analog audio signals to transmit digital audio signals and transmitting the transmit digital audio signals to the public telephone network, and a plurality of operator workstations, coupled to the channel bank, for use by an operator to service calls from the subscribers, each operator workstation comprising:

a processor for controlling the operation of the operator workstation;

an operator input/output interface coupled to the processor for enabling the operator to service calls received from the subscribers, and a voice interface circuit board coupled to the channel bank and the processor for controlling audio characteristics of audio signals received and transmitted by the operator workstation, the circuit board comprising:

an interface for receiving the receive analog audio signals from the channel bank, and for transmitting the transmit analog audio signals to the channel bank, an audio characteristics control circuit coupled to the interface for adjusting the audio characteristics of the receive and transmit analog audio signals and for recording and generating voice messages in response to commands received from the operator via the operator input/output interface to be transmitted to the subscriber, the audio characteristics control circuit further comprising a voice processor coupled to the interface for generating control signals to control the adjustment of at least one of the audio characteristics of the analog audio signals, and a headset interface coupled to the audio characteristics control circuit for transmitting the adjusted receive analog audio signals from the audio characteristics control circuit to at least one operator headset and for transmitting the transmit analog audio signals from the at least one operator headset to the audio characteristics control circuit; and a computer coupled via a network to each one of the plurality of operator workstations for storing operator profile information that is used to control the audio characteristics of the receive and transmit analog audio signals and for transmitting the operator profile information to the plurality of operator workstations.

2. The operator system according to claim 1 wherein the headset interface of the voice interface circuit board further comprises:

at least two receive channels to separately transmit the adjusted receive analog audio signals to at least two headsets coupled to the headset interface; and at least two transmit channels to separately receive the transmit analog audio signals from the at least two headsets coupled to the headset interface.

3. The operator system according to claim 1 wherein the at least one of the audio characteristics of the analog audio signals adjusted is a member of the group of audio characteristics consisting of volume, echo, and sidetone.

4. The operator system according to claim 1 wherein the audio characteristics control circuit of the voice interface circuit board further comprises a plurality of digital-to-analog converters each having one input coupled to the processor for receiving the control signals, a second input for receiving the analog audio signal and an output for transmitting the adjusted analog audio signals.

5. The operator system according to claim 1 wherein the audio characteristics control circuit of the voice interface circuit board further comprises a bus interface intercoupled between the processor and the voice processor for receiving control signals from the processor to control the audio characteristics of the analog audio signals and for transmitting the control signals to the audio characteristics circuit.

6. An operator service center for providing services to subscribers in a public telephone network, the operator service center comprising:

a channel bank for receiving receive digital audio signals from the public telephone network, converting the receive digital audio signals to receive analog audio signals and transmitting transmit digital audio signals to the public telephone network; and a plurality of operator workstations, coupled to the channel bank, for use by an operator to service calls from the subscribers, each operator workstation comprising:

a processor for controlling the operation of the operator workstation, an operator input/output interface coupled to the processor for enabling the operator to service calls received from the subscribers, and a voice interface circuit board coupled to the channel bank and the processor for controlling audio characteristics of audio signals received and transmitted by the operator workstation, the circuit board comprising:

an interface for receiving the receive analog audio signals from the channel bank, and for transmitting the transmit analog audio signals to the channel bank, an audio characteristics control circuit coupled to the interface for adjusting the audio characteristics of the receive and transmit analog audio signals and for recording and generating voice messages in response to commands received from the operator via the operator input/output interface to be transmitted to the subscriber, the audio characteristics control circuit further comprising a voice processor coupled to the interface for generating control signals to control the adjustment of at least one of the audio characteristics of the analog audio signals, and a headset interface coupled to the audio characteristics control circuit for transmitting the adjusted receive analog audio signals from the audio characteristics control circuit to at least one operator headset and for transmitting the transmit analog audio signals from the at least one operator headset to the audio characteristics control circuit.

7. The operator service center according to claim 6 wherein the headset interface of the voice interface circuit board further comprises:

at least two receive channels to separately transmit the adjusted receive analog audio signals to at least two headsets coupled to the headset interface; and at least two transmit channels to separately receive the transmit analog audio signals from the at least two headsets coupled to the headset interface.

8. The operator service center according to claim 6 wherein the least one of the audio characteristics of the analog audio signals adjusted is a member of the group of audio characteristics consisting of volume, echo, and sidetone.

9. The operator service center according to claim 6 wherein the audio characteristics control circuit of the voice interface circuit board further comprises a plurality of digital-to-analog converters each having one input coupled to the processor for receiving the control signals, a second input for receiving the analog audio signal and an output for transmitting the adjusted analog audio signal.

10. The operator service center according to claim 6 wherein the audio characteristics control circuit of the voice interface circuit board further comprises a bus interface intercoupled between the processor and the voice processor for receiving control signals from the processor to control the audio characteristics of the analog audio signals and for transmitting the control signals to the audio characteristics circuit.

11. An operator workstation for use by an operator to service calls from subscribers in a public telephone network, the operator workstation comprising:
   a processor for controlling the operation of the operator workstation;
   an operator input/output interface coupled to the processor for enabling the operator to service calls received from the subscribers; and
   a voice interface circuit board coupled to a public telephone network interface and the processor for controlling audio characteristics of audio signals received and transmitted by the operator workstation, the circuit board comprising:
      an interface for receiving receive analog audio signals from the public telephone network interface and for transmitting transmit analog audio signals to the public telephone network interface,
      an audio characteristics control circuit coupled to the interface for adjusting the audio characteristics of the receive and transmit analog audio signals and for recording and generating voice messages in response to commands received from the operator via the operator input/output interface to be transmitted to the subscriber, the audio characteristics control circuit further comprising a voice processor coupled to the interface for generating control signals to control the adjustment of at least one of the audio characteristics of the analog audio signals, and
      a headset interface coupled to the audio characteristics control circuit for transmitting the adjusted receive analog audio signals from the audio characteristics control circuit to at least one operator headset and for transmitting the transmit analog audio signals from the at least one operator headset to the audio characteristics control circuit.

12. The operator workstation according to claim 11 wherein the headset interface of the voice interface circuit board further comprises:
   at least two receive channels to separately transmit the adjusted receive analog audio signals to at least two headsets coupled to the headset interface; and
   at least two transmit channels to separately receive the transmit analog audio signals from the at least two headsets coupled to the headset interface.

13. The operator service center according to claim 11 wherein the least one of the audio characteristics of the analog audio signals adjusted is a member of the group of audio characteristics consisting of volume, echo, and sidetone.

14. The operator workstation according to claim 11 wherein the audio characteristics control circuit of the voice interface circuit board further comprises a plurality of digital-to-analog converters each having one input coupled to the processor for receiving the control signals, a second input for receiving the analog audio signal and an output for transmitting the adjusted analog audio signal.

15. The operator workstation according to claim 11 wherein the audio characteristics control circuit of the voice interface circuit board further comprises a bus interface intercoupled between the processor and the voice processor for receiving control signals from the processor to control the audio characteristics of the analog audio signals and for transmitting the control signals to the audio characteristics circuit.

16. A circuit board for controlling audio characteristics of audio signals in a telecommunications network comprising:
   an interface for receiving analog audio signals from a telecommunications network interface;
   an audio characteristics control circuit coupled to the interface, for adjusting the audio characteristics of the analog audio signals, the audio characteristics control circuit further comprising a voice processor coupled to the interface for generating control signals to control the adjustment of at least one of the audio characteristics of the received analog audio signals; and
   a headset interface coupled to the audio characteristics control circuit for transmitting the adjusted analog audio signals from the audio characteristics control circuit to at least one operator headset.

17. The circuit board according to claim 16 wherein the at least one of the audio characteristics of the received analog audio signals adjusted is a member of the group of audio characteristics consisting of volume, echo, and sidetone.

18. The circuit board according to claim 16 wherein the headset interface further comprises
   at least two receive channels to separately transmit the adjusted received analog audio signals to at least two headsets coupled to the headset interface.

19. The circuit board according to claim 16 wherein the audio characteristics control circuit further comprises at least one digital-to-analog converter having one input coupled to the voice processor for receiving the control signals, a second input for receiving the analog audio signal and an output for transmitting the adjusted analog audio signal.

20. In an operator system for providing services to subscribers in a public telephone network, a circuit board for controlling audio characteristics of audio signals in the public telephone network comprising:
   an interface for receiving receive analog audio signals from a telecommunications network interface and for transmitting transmit analog audio signals to the telecommunications network interface;
   an audio characteristics control circuit coupled to the interface, for adjusting the audio characteristics of the receive and transmit analog audio signals and for recording and generating voice messages to be transmitted to the telecommunications network via the interface, the audio characteristics control circuit further comprising a voice processor coupled to the interface for generating control signals to control the adjustment of at least one of the audio characteristics of the analog audio signals; and
   a headset interface coupled to the audio characteristics control circuit for transmitting the adjusted receive analog audio signals from the audio characteristics control circuit to at least one operator headset and for transmitting the analog transmit audio signals from at least one operator headset to the audio characteristics control circuit.

21. In an operator workstation for use by an operator to service calls from subscribers in a public telephone network, a circuit board for controlling audio characteristics of audio signals in the public telephone network comprising:

an interface for receiving receive analog audio signals from a telecommunications network interface and for transmitting transmit analog audio signals to the telecommunications network interface;

an audio characteristics control circuit coupled to the interface, for adjusting the audio characteristics of the receive and transmit analog audio signals and for recording and generating voice messages to be transmitted to the telecommunications network via the interface, the audio characteristics control circuit further comprising a voice processor coupled to the interface for generating control signals to control the adjustment of at least one of the audio characteristics of the analog audio signals; and a headset interface coupled to the audio characteristics control circuit for transmitting the adjusted receive analog audio signals from the audio characteristics control circuit to at least one operator headset and for transmitting the analog transmit audio signals from at least one operator headset to the audio characteristics control circuit.

22. A circuit board for controlling audio characteristics of audio signals in a telecommunications network comprising:

an interface for transmitting analog audio signals to a telecommunications network interface;

an audio characteristics control circuit coupled to the interface, for adjusting the audio characteristics of the analog audio signals and for recording and generating voice messages to be transmitted to the telecommunications network via the interface, the audio characteristics control circuit further comprising a voice processor coupled to the interface for generating control signals to control the adjustment of at least one of the audio characteristics of the transmitted analog audio signals; and a headset interface coupled to the audio characteristics control circuit for transmitting the analog audio signals from at least one operator headset to the audio characteristics control circuit.

23. The circuit board according to claim 22 wherein the at least one of the audio characteristics of the transmitted analog audio signals adjusted is a member of the group of audio characteristics consisting of volume, echo, and sidetone.

24. The circuit board according to claim 22 wherein the headset interface further comprises at least two transmit channels to separately receive the analog audio signals from at least two headsets coupled to the headset interface.

25. The circuit board according to claim 22 wherein the audio characteristics control circuit further comprises at least one digital-to-analog converter having one input coupled to the voice processor for receiving the control signals, a second input for receiving the analog audio signal and an output for transmitting the adjusted analog audio signal.

* * * * *